(12) United States Patent
Maity et al.

(10) Patent No.: US 11,654,573 B2
(45) Date of Patent: May 23, 2023

(54) METHODS AND SYSTEMS FOR ENABLING HUMAN ROBOT INTERACTION BY SHARING COGNITION

(71) Applicant: Tata Consultancy Services Limited, Mumbai (IN)

(72) Inventors: Soumyadip Maity, Kolkata (IN); Gourav Kumar, Kolkata (IN); Ruddra Dev Roy Choudhury, Kolkata (IN); Brojeshwar Bhowmick, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 288 days.

(21) Appl. No.: 17/168,076

(22) Filed: Feb. 4, 2021

(65) Prior Publication Data
US 2021/0370516 A1  Dec. 2, 2021

(30) Foreign Application Priority Data

May 29, 2020  (IN) .............................. 202021022688

(51) Int. Cl.
*B25J 9/16* (2006.01)
*B25J 11/00* (2006.01)
(Continued)

(52) U.S. Cl.
CPC ............. *B25J 9/1697* (2013.01); *B25J 9/161* (2013.01); *B25J 9/163* (2013.01); *B25J 9/1658* (2013.01);
(Continued)

(58) Field of Classification Search
CPC . B25J 9/1697; B25J 9/161; B25J 9/163; B25J 9/1658; B25J 9/1664; B25J 11/0005;
(Continued)

(56) References Cited

U.S. PATENT DOCUMENTS 11,531,343 B1 * 12/2022 Kitchens .............. G05D 1/0231

FOREIGN PATENT DOCUMENTS

CN         105468145 B      5/2019

OTHER PUBLICATIONS

Arka Sadhu, Kan Chen, Ram Nevatia; "Zero-Shot Grounding of Objects From Natural Language Queries", Proceedings of the IEEE/CVF International Conference on Computer Vision (ICCV), 2019, pp. 4694-4703 (Year: 2019).*

(Continued)

*Primary Examiner* — Adam R Mott
*Assistant Examiner* — Matthew C Gammon
(74) *Attorney, Agent, or Firm* — Finnegan, Henderson, Farabow, Garrett & Dunner LLP (57) ABSTRACT

The disclosure generally relates to methods and systems for enabling human robot interaction by cognition sharing which includes gesture and audio. Conventional techniques that use the gestures and the speech, require extra hardware setup and are limited to navigation in structured outdoor driving environments. The present disclosure herein provides methods and systems that solves the technical problem of enabling the human robot interaction with a two-step approach by transferring the cognitive load from the human to the robot. An accurate shared perspective associated with the task is determined in the first step by computing relative frame transformations based on understanding of navigational gestures of the subject. Then, the shared perspective transformed to the robot in the field view of the robot. The transformed shared perspective is then given to a language grounding technique in the second step, to accurately determine a final goal associated with the task.

11 Claims, 4 Drawing Sheets

(51) Int. Cl.
  *B25J 13/00* (2006.01)
  *B25J 13/08* (2006.01)
(52) U.S. Cl.
  CPC ......... *B25J 9/1664* (2013.01); *B25J 11/0005* (2013.01); *B25J 13/003* (2013.01); *B25J 13/088* (2013.01)
(58) Field of Classification Search
  CPC ........ B25J 13/003; B25J 13/088; B25J 13/00; G05D 1/0016
  See application file for complete search history.

(56) References Cited

OTHER PUBLICATIONS

Stiefelhagen, Reiner. et al., "Natural Human-Robot Interaction using Speech, Head Pose and Gestures", International Conference on Intelligent Robots and Systems, Date: 2004, Publisher: IEEE, Link: https://www.researchgate.net/publication/4122102_Natural_human-robot_interaction_using_speech_head_pose_and_gestures/link/5760ea0208ae2b8d20eb6946/download.

Lemaignan, Severin et al., "Artificial cognition for social human-robot interaction: An implementation", Artificial Intelligence, Date: Jul. 2016, Publisher: Research Gate, Link: https://www.researchgate.net/publication/305208728_Artificial_Cognition_for_Social_Human-Robot_Interaction_An_Implementation/link/5b17fea1a6fdcca67b5d9bd8/download.

Boboc, Razvan Gabriel et al., "Using body gestures and voice commands for assistive interaction", Artificial Intelligence, Date: 2013, Publisher: Semantic Scholar, Link: https://www.semanticscholar.org/paper/Using-body-gestures-and-voice-commands-for-Boboc-Dugulean%C4%83/3cfa9334af69afe9f24437992b07f5c479dc0b58.

Hu, Jun et al., "VGPN: Voice-Guided Pointing Robot Navigation for Humans", Robotics and Biomimetics, Date: Apr. 2020, Publisher: ARXIV, Link: https://arxiv.org/pdf/2004.01600.pdf.

* cited by examiner

METHODS AND SYSTEMS FOR ENABLING HUMAN ROBOT INTERACTION BY SHARING COGNITION

PRIORITY CLAIM

This U.S. patent application claims priority under 35 U.S.C. § 119 to: Indian Patent Application No. 202021022688, filed on 29 May 2020. The entire contents of the aforementioned application are incorporated herein by reference.

TECHNICAL FIELD

The disclosure herein generally relates to the field of human robot interaction (HRI), and, more particularly, to methods and systems for enabling human robot interaction by cognition sharing which includes gesture and audio.

BACKGROUND

Cooperation among humans makes easy to execute tasks and navigate seamlessly even in unknown environments. With the individual knowledge and collective cognition skills, the human may reason about and perform well in unforeseen situations and environments. To achieve a similar potential for a robot navigating among humans and interacting with them, it is crucial to acquire an ability to communicate efficiently and share cognition most easily and naturally for humans. The humans may share the cognition to the robots in order to perform a task, through various gestures and speech. The gestures provide a spatial information about the environment to perform the task. By fusing both the gestures and the speech, the cognition about the environment may be effectively communicated to the robot and hence an accuracy of performing the task may be enhanced. But since the gestures and the speech are uncorrelated at a level of raw inputs, learning a correlation between the two is quite challenging in effectively sharing the cognition to the robot.

Conventional techniques that use the gestures and the speech for the human robot interaction, are based on using various combinations of hardware sensor modalities to have a better communication and interaction between the humans and the robots. Also, some conventional techniques using the gestures and the speech for the human robot interaction, are limited to the navigation in structured outdoor driving environments or a discrete set of directions (motions) in indoor environments. This makes the task complex for moving around in the indoor environment with a non-discrete set of directions. Also, in situations like occluded perspective for the target region of interest, one-shot determination of the final goal of the task is challenging especially in the indoor environments.

SUMMARY

Embodiments of the present disclosure present technological improvements as solutions to one or more of the above-mentioned technical problems recognized by the inventors in conventional systems.

In an aspect, there is provided a processor-implemented method for enabling a human robot interaction (HRI) by sharing cognition between a subject and a robot, the method comprising the steps of: acquiring, a visual feed of the subject and an audio feed of the subject, wherein the visual feed and the audio feed are acquired during a directional assistance provided by the subject to the robot, to perform a task, the visual feed comprises one or more visual scenes of the subject while providing the directional assistance, and the audio feed comprises one or more natural language instructions of the subject while providing the directional assistance; estimating, a pointing direction of the subject in a field view of the robot, based on a body skeleton based gesture of the subject and a head pose based gaze direction of the subject, using the one or more visual scenes present in the visual feed; estimating, an intermediate goal pose for the robot, based on the estimated pointing direction, at a predefined distance from a position of the subject, using a pre-built 2-dimensional (2-D) occupancy map and a scaling factor, wherein the intermediate goal pose comprises a set of coordinates defining a position and an orientation; generating, a trajectory for the robot to reach the estimated intermediate goal pose from a present robot pose, based on a present odometry of the robot, using the pre-built 2-D occupancy map and a (robot operating system) ROS movebase planner, to navigate the robot to reach the estimated intermediate goal pose based on the generated trajectory; acquiring, an intermediate goal image, from present perspective of the robot after reaching the estimated intermediate goal pose; predicting, a matching region associated with the task, based on one or more language features and the intermediate goal image, using a zero-shot single-stage network (ZSGNet) based language grounding technique, wherein the one or more language features are obtained from the audio feed of the subject; and navigating the robot, to a final goal point to perform the task, using the ROS movebase planner, wherein the final goal point is determined based on the predicted matching region using the pre-built 2-D occupancy map.

In another aspect, there is provided a system for enabling a human robot interaction (HRI) by sharing cognition between a subject and a robot, the system comprising: a memory storing instructions; one or more Input/Output (I/O) interfaces; and one or more hardware processors coupled to the memory via the one or more I/O interfaces, wherein the one or more hardware processors are configured by the instructions to: acquire a visual feed of the subject and an audio feed of the subject, wherein the visual feed and the audio feed are acquired during a directional assistance provided by the subject to the robot, to perform a task, the visual feed comprises one or more visual scenes of the subject while providing the directional assistance, and the audio feed comprises one or more natural language instructions of the subject while providing the directional assistance; estimate a pointing direction of the subject in a field view of the robot, based on a body skeleton based gesture of the subject and a head pose based gaze direction of the subject, using the one or more visual scenes present in the visual feed; estimate an intermediate goal pose for the robot, based on the estimated pointing direction, at a predefined distance from a position of the subject, using a pre-built 2-dimensional (2-D) occupancy map and a scaling factor, wherein the intermediate goal pose comprises a set of coordinates defining a position and an orientation; generate a trajectory for the robot to reach the estimated intermediate goal pose from a present robot pose, based on a present odometry of the robot, using the pre-built 2-D occupancy map and a robot operating system (ROS) movebase planner, to navigate the robot to reach the estimated intermediate goal pose based on the generated trajectory; acquire an intermediate goal image, from present perspective of the robot after reaching the estimated intermediate goal pose; predict a matching region associated with the task, based on one or more language features and the intermediate goal image, using a zero-shot single-stage network (ZSGNet) based language grounding technique, wherein the one or more language features are obtained from the audio feed of the subject; and navigate the robot to a final goal point to perform the task, using the ROS movebase planner, wherein the final goal point is determined based on the predicted matching region using the pre-built 2-D occupancy map.

In yet another aspect, there is provided a computer program product comprising a non-transitory computer readable medium having a computer readable program embodied therein, wherein the computer readable program, when executed on a computing device, causes the computing device to: acquire a visual feed of the subject and an audio feed of the subject, wherein the visual feed and the audio feed are acquired during a directional assistance provided by the subject to the robot, to perform a task, the visual feed comprises one or more visual scenes of the subject while providing the directional assistance, and the audio feed comprises one or more natural language instructions of the subject while providing the directional assistance; estimate a pointing direction of the subject in a field view of the robot, based on a body skeleton based gesture of the subject and a head pose based gaze direction of the subject, using the one or more visual scenes present in the visual feed; estimate an intermediate goal pose for the robot, based on the estimated pointing direction, at a predefined distance from a position of the subject, using a pre-built 2-dimensional (2-D) occupancy map and a scaling factor, wherein the intermediate goal pose comprises a set of coordinates defining a position and an orientation; generate a trajectory for the robot to reach the estimated intermediate goal pose from a present robot pose, based on a present odometry of the robot, using the pre-built 2-D occupancy map and a robot operating system (ROS) movebase planner, to navigate the robot to reach the estimated intermediate goal pose based on the generated trajectory; acquire an intermediate goal image, from present perspective of the robot after reaching the estimated intermediate goal pose; predict a matching region associated with the task, based on one or more language features and the intermediate goal image, using a zero-shot single-stage network (ZSGNet) based language grounding technique, wherein the one or more language features are obtained from the audio feed of the subject; and navigate the robot to a final goal point to perform the task, using the ROS movebase planner, wherein the final goal point is determined based on the predicted matching region using the pre-built 2-D occupancy map.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Since inception of robotics, navigation in an environment built as per human convenience has been both challenging as well as of high significance. Leveraging a collective cognition of a social environment around us for conducting a task is a capability that makes it possible to reliably perform the tasks. To inculcate this capability in robots for navigation in an unknown or unfamiliar environment, there is a need for a way for the robots to communicate with humans naturally.

Use of pointing gestures using hand movements or head orientation is one of the ways in which people communicate with the world. It is well known that pointing at a reference object (the gesture) is a much faster and more convenient method than describing it verbally. Humans of all ages, culture and background tend to provide the gestures when they speak for navigational and directional assistance. It is a foundational building block of human communication because it is used during early phases of language development in combination with speech, to name objects, indicating a developmentally early correspondence between the word and the gesture. So as the need of the gesture for directional and contextual sense while speaking about the spatial environment, it becomes very crucial to incorporate both the gesture and the speech for building the communication. As both the gestures and the speech are uncorrelated at a level of raw inputs, learning a correlation between the two is important to have robust communication and context-aware understanding of the environment.

Conventional techniques that use the gestures and the speech for human robot interaction (HRI) are limited and may work only on natural language commands. Providing the natural language commands to the robot may pose few challenges for the human from whom the robot seeks help. Firstly, communicating an exact turn angle for the robot towards a goal to perform the task, only through the natural language commands is very difficult for any human, especially in cases where the robot is oriented in other direction to the human. Hence predefined discrete actions may not be of much help in many of the indoor environment. Secondly, the natural language commands which are supposed to be given in a robot-centric frame, adds an extra cognitive overhead on the human making the communication unnatural and inconvenient.

Some conventional techniques using the gestures and the speech for the human robot interaction, are based on using various combinations of hardware sensor modalities to have a better communication and interaction between the humans and the robot. These techniques may require extra hardware that need to be placed either on the robot or in the given environment. But, the most natural way of communication comes when there is no prerequisite to have dedicated sensors/hardware mounted on them or in their immediate surrounding.

Also, some conventional techniques that use the gestures and the speech for the human robot interaction, are limited to the navigation in structured outdoor driving environments or a discrete set of directions (motions) in indoor environments but makes the task complex for moving around in the indoor environment with a non-discrete set of directions. For the tasks like navigation, localization, and mapping pertaining to the robot in the indoor environments where multiple instances of the same object are frequently present, unique identifications of objects is crucial for completing the task. Also, in situations like occluded perspective for the target region of interest, one-shot determination of the final goal associated with the task may be challenging.

The present disclosure herein provides methods and systems that solves the technical problem of enabling the human robot interaction by transferring the cognitive load from the human to the robot. In the first step, an accurate intermediate goal pose to capture shared perspective associated with the task is determined by computing relative frame transformations based on understanding of navigational gestures of a subject. The intermediate goal pose is then transformed in the coordinate frame of the robot. In the second step, the intermediate goal image is captured from the intermediate goal pose and is given to a language grounding technique, along with the natural language instructions (speech) of the subject to accurately determine a final goal associated with the task. In the context of the present disclosure, the robot may be any movable equipment such as a movable robot, a humanoid robot, an industrial robot, a telepresence robot and so on.

In the context of the present disclosure, the terms like the subject and the human are interchangeably used, but they refer to any living being preferably the human who can provide the directional assistance to the robot to perform a specific task. Though the present disclosure is mainly focused to enable the human robot interaction for performing the task in indoor environments, but the scope of the invention is not limited to the indoor environments.

Referring now to the drawings, and more particularly to FIG. 1 through FIG. 3B, where similar reference characters denote corresponding features consistently throughout the figures, there are shown preferred embodiments and these embodiments are described in the context of the following exemplary systems and/or methods.

Figure 1:
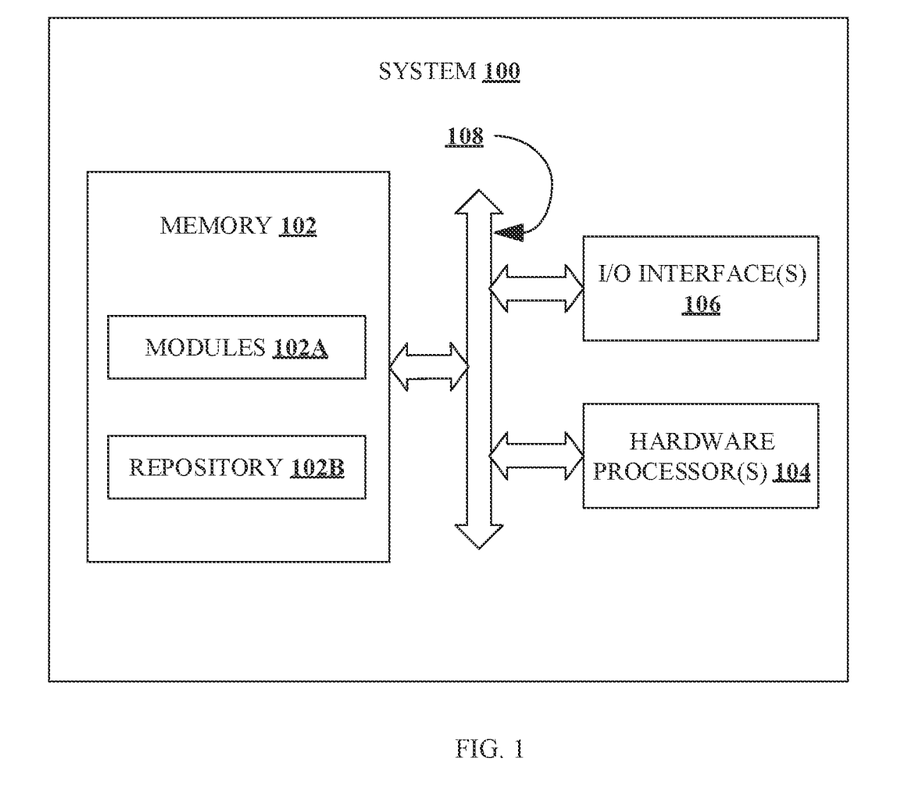
FIG. 1 is an exemplary block diagram of a system for enabling human robot interaction by cognition sharing, in accordance with some embodiments of the present disclosure.

FIG. 1 is an exemplary block diagram of a system for enabling human robot interaction by cognition sharing, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computer, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102A and a repository 102B for storing data processed, received, and generated by one or more of the plurality of modules 102A. The plurality of modules 102A may include routines, programs, objects, components, data structures, and so on, which perform particular tasks or implement particular abstract data types.

The plurality of modules 102A may include programs or computer-readable instructions or coded instructions that supplement applications or functions performed by the system 100. The plurality of modules 102A may also be used as, signal processor(s), state machine(s), logic circuitries, and/or any other device or component that manipulates signals based on operational instructions. Further, the plurality of modules 102A can be used by hardware, by computer-readable instructions executed by the one or more hardware processors 104, or by a combination thereof. In an embodiment, the plurality of modules 102A can include various sub-modules (not shown in FIG. 1). Further, the memory 102 may include information pertaining to input(s)/output(s) of each step performed by the processor(s) 104 of the system 100 and methods of the present disclosure.

The repository 102B may include a database or a data engine. Further, the repository 102B amongst other things, may serve as a database or includes a plurality of databases for storing the data that is processed, received, or generated as a result of the execution of the plurality of modules 102A. Although the repository 102B is shown internal to the system 100, it will be noted that, in alternate embodiments, the repository 102B can also be implemented external to the system 100, where the repository 102B may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102B may be distributed between the system 100 and the external database.

In an embodiment, the system 100 may be present in the robot for enabling the human robot interaction by sharing cognition between the subject and the robot. In another embodiment, the system 100 may be externally connected to the robot via the I/O interface(s) 106. In an embodiment, the system 100 may be externally connected to the robot preferably wirelessly but it is not limited to.

Figure 2:
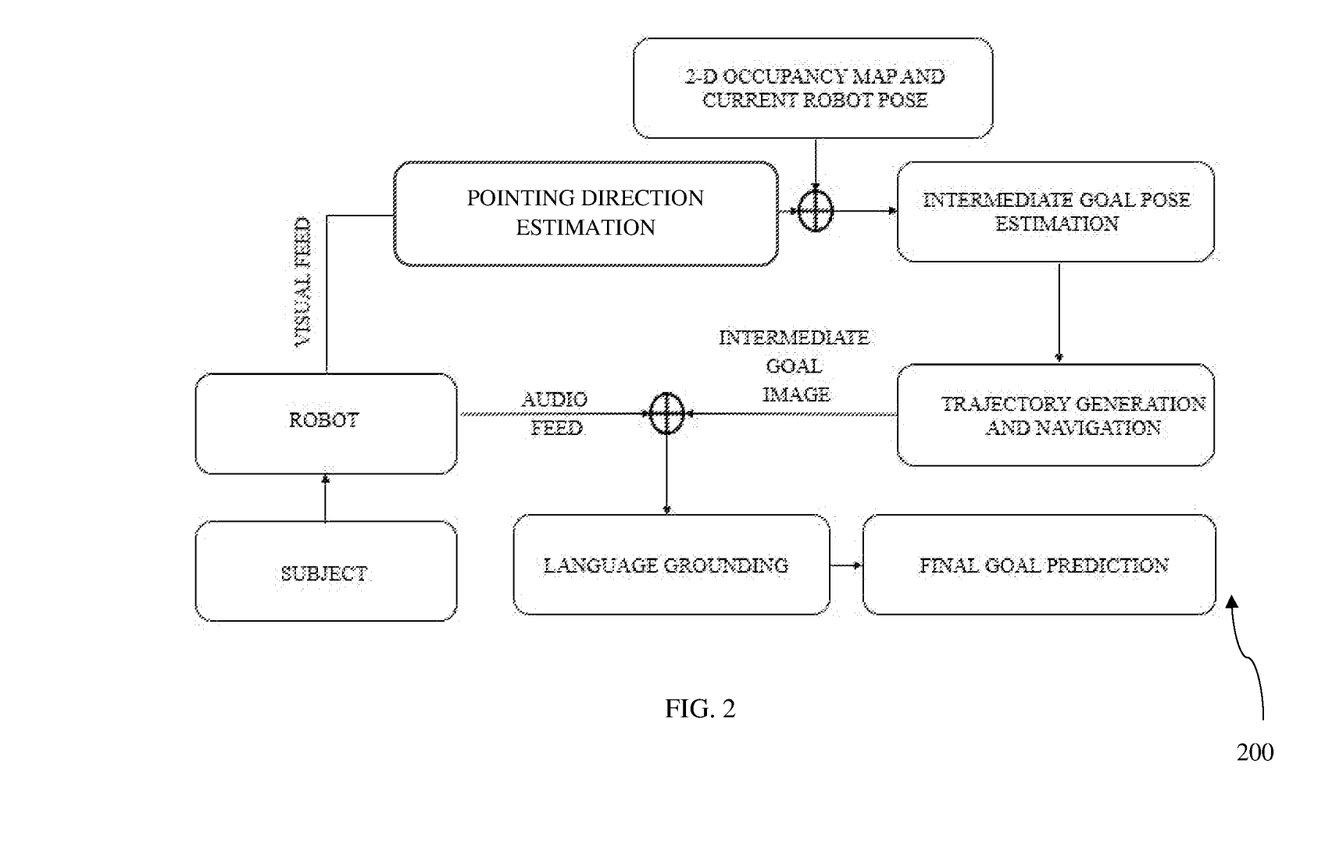
FIG. 2 is an exemplary schematic diagram of a processor-implemented method for the enabling human robot interaction by cognition sharing, in accordance with some embodiments of the present disclosure.
Figure 3A:
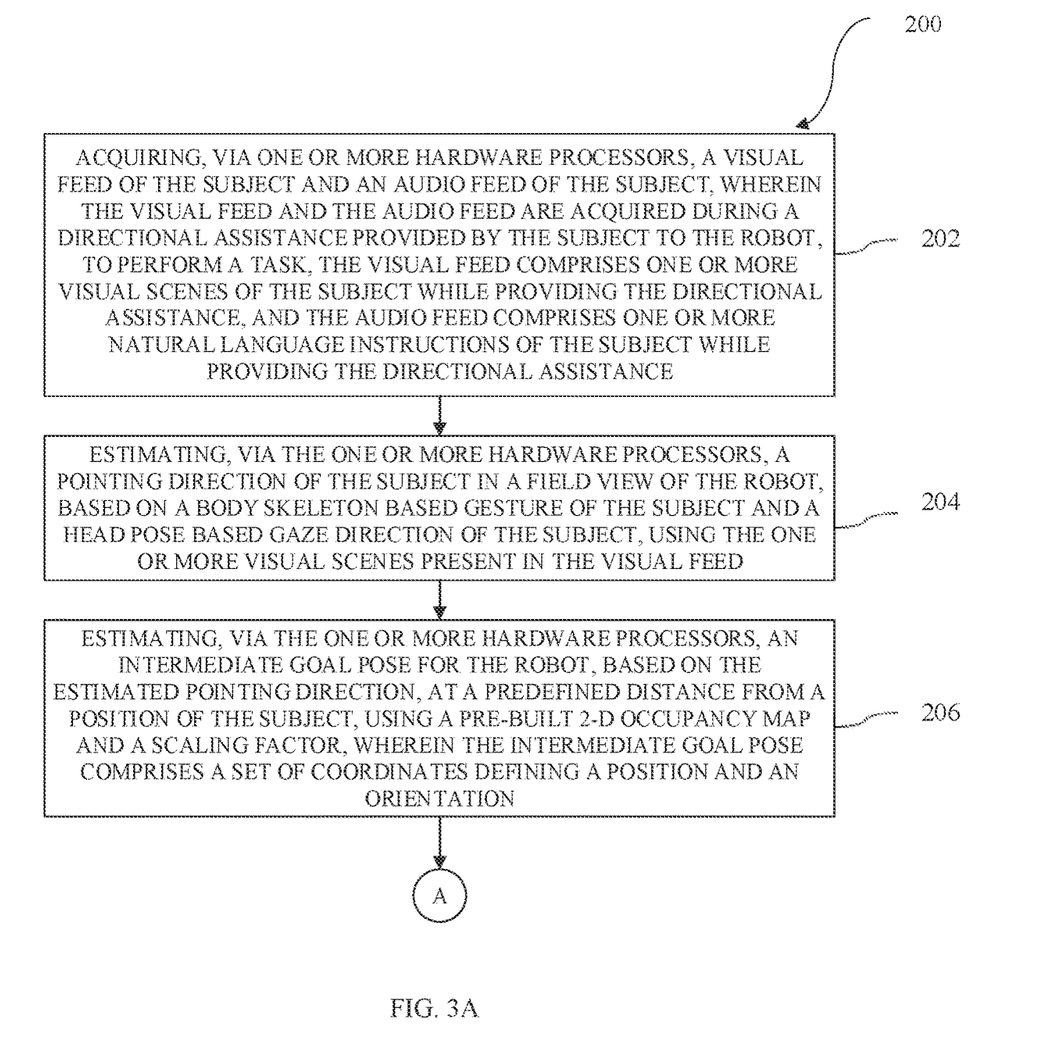
FIG. 3A through FIG. 3B illustrate exemplary flow diagrams of the processor-implemented method for enabling the human robot interaction by cognition sharing, in accordance with some embodiments of the present disclosure.
Figure 3B:
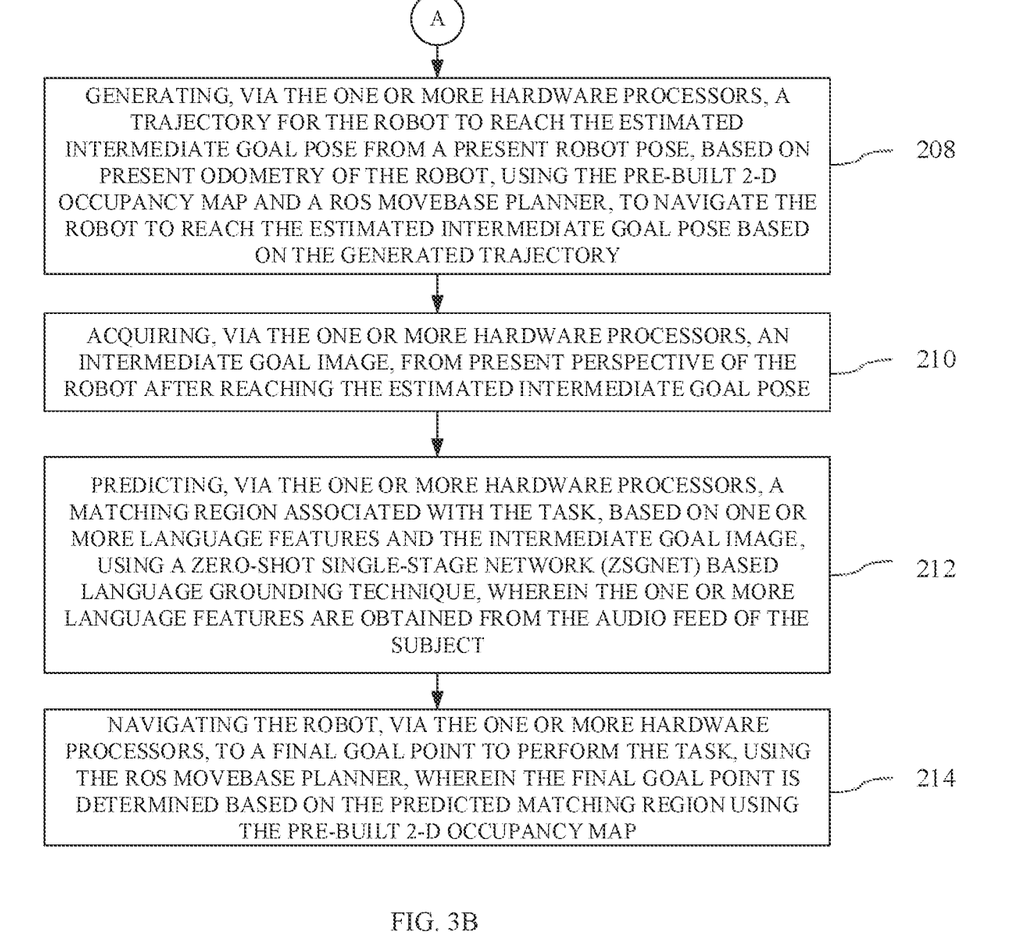

Referring collectively to FIG. 2 and FIG. 3A through FIG. 3B, components and functionalities of the system 100 are described in accordance with an example embodiment of the present disclosure. For example, FIG. 2 is an exemplary schematic diagram of a processor-implemented method 200 for enabling the human robot interaction by cognition sharing, in accordance with some embodiments of the present disclosure. FIG. 3A through FIG. 3B illustrate exemplary flow diagrams of the processor-implemented method 200 for enabling the human robot interaction by cognition sharing, in accordance with some embodiments of the present disclosure. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 202 of the method 200, the one or more hardware processors 104 of the system 100 are configured to acquire a visual feed of the subject and an audio feed of the subject. Both the visual feed and the audio feed are acquired during a directional assistance provided by the subject to the robot. The directional assistance may be associated with the specific task the robot has to be performed in the indoor environment. In an embodiment, the subject may command the robot to perform the specific task. In another embodiment, the robot may seek to perform the specific task on its own based on a requirement. For both the above embodiments, the robot may initiate a dialogue with the subject by asking one or more questions related to the directional assistance to reach a final goal associated with the specific task.

In an embodiment, the visual feed includes one or more visual scenes that are associated with the gesture of the subject while providing the directional assistance. The gestures associated with the directional assistance may communicate spatial information about a target region of the interest to perform the task, through hand movements. The type of gestures includes iconic, deictics, metaphoric and beat with only iconic and deictics employed in the navigation cues. The audio feed includes one or more natural language instructions provided by the subject while providing the directional assistance to the robot.

For example, the specific task may be 'picking a Television (TV) remote controller that is present on a black chair.

Hence a final goal of the robot may be to reach near to the black chair so that the robot can pick the TV remote controller. Hence the target region of the interest may be the black chair. To perform the task, the robot may ask the one or more questions such as 'where is the TV remote controller?'. The subject in response to the question asked by robot may provide the directional assistance. The directional assistance may include the answer (on the black chair) for the query through voice (speech), as well as a pointing direction through the gesture, towards the black chair. It may be assumed that the robot and the subject are facing to each other and the subject is familiar with the environment so that he or she may provide the directional assistance accurately. Since the target region of interest of the final goal may not be directly visible to the robot, though it may be visible to the subject from his or her present position, it is challenging for the robot to directly reach to the final goal point. Even it is further challenging task when the target region of interest is occluded.

The visual feed and the audio feed may be captured during a time period between when the dialogue been initiated by the robot and when the conversion is completed between the robot and the subject with the directional assistance. A visual scene from the one or more visual scenes may include an accurate gesture of the subject while he or she is providing the directional assistance through the pointing direction towards, the target region of interest. The one or more natural language instructions of the audio feed are the answers provided by the subject, to the questions asked by the robot.

In an embodiment, the visual feed of the subject may be acquired through a monocular camera that is installed in the robot. The audio feed of the subject may be captured through one or more microphones installed in the robot. If the system 100 is externally to the robot, then the robot may be configured to send the visual feed and the audio feed to the system 100 for further processing.

At step 204 of the method 200, the one or more hardware processors 104 of the system 100 are configured to estimate a pointing direction of the subject in a field view of the robot by using the one or more visual scenes present in the visual feed. A visual scene from the one or more visual scene that best depict the gesture of the subject while he or she is providing the directional assistance with the pointing direction is selected. The selected visual scene is processed to estimate a body skeleton based gesture of the subject and a head pose based gaze direction of the subject. The pointing direction of the subject indicates the direction assisted by the subject in response to the query asked by the robot. The pointing direction of the subject in other words is a final goal scene having the target region of interest, from which the defined task to be performed by the robot.

In an embodiment, the body skeleton based gesture of the subject is estimated from the selected visual scene, by using a 3-dimensional (3-D) pose prediction technique. In an embodiment, the 3-D pose prediction technique may utilize a pre-trained deep neural network. The pre-trained deep neural network takes the selected visual scene as an input and produces a predicted 3-D pose of the subject. The predicted 3-D pose includes 3-D coordinates of 16 predefined skeletal joints of the subject along with their joint IDs (identification numbers).

The 3-D coordinates of the skeletal joints along with the joint IDs may be used to calculate orientation of some of relevant bones such as spine and limbs of the body of the subject by connecting appropriate skeletal joints. Since an angle between the spine and the hand is used as a parameter used to detect the gesture and for computing the pointing direction, the body skeleton based gesture of the subject is estimated as an first azimuthal angle by using the skeletal joints associated with the spine and the limbs.

In an embodiment, the head pose based gaze direction of the subject is estimated from the selected visual scene, by using a gaze direction prediction technique. In an embodiment, the gaze direction prediction technique may utilize a pre-trained deep neural network that takes the selected visual scene as an input and predicts a head orientation of the subject as a second azimuthal angle.

Since the first azimuthal angle and the second azimuthal angle alone may contain an average error, the pointing direction of the subject in the field view of the robot may be uncertain. This error in the pointing direction even by a small magnitude may scale up to a large error margin if the final goal scene associated with the target region of interest is at a large distance from the subject. So, a unified angle may be calculated from the first azimuthal angle and the second azimuthal angle, which estimates the accurate pointing direction of the subject in the field view of the robot. In an embodiment, the first azimuthal angle associated with the body skeleton based gesture of the subject and the second azimuthal angle associated with the head pose based gaze direction of the subject are used to calculate the unified azimuthal angle of the subject according to the below equation:

Unified azimuthal angle=$a$*first azimuthal angle+$b$*second azimuthal angle where a and b are weights and a+b=1. For example, value of a may be 0.4 and value of b may be 0.6

At step 206 of the method 200, the one or more hardware processors 104 of the system 100 are configured to estimate an intermediate goal pose for the robot, based on the estimated pointing direction. The intermediate goal pose for the robot is estimated at a predefined distance from a current position of the subject, using a pre-built 2-dimensional (2-D) 2-D occupancy map and a scaling factor. The intermediate goal pose indicates shared perspective which indicates the final goal scene associated with the target region of interest that may be viewed by the subject while providing the directional assistance. The shared perspective is to be transformed to the field view of the robot so that the robot can view the final goal scene from the intermediate goal pose. The intermediate goal pose includes a set of coordinates defining a position and an orientation. In an embodiment, the predefined distance is for example 1 metre.

In an embodiment, the pre-built occupancy map is a map of present indoor environment which is built based on some prior exploration using different sensors to map the environment. The pre-built 2-D occupancy map is basically obtained by projecting a 3-dimensional (3-D) occupancy map on a ground plane. The occupancy map is a metric representation of the given environment which includes information of navigable and obstructed regions of the environment.

In an embodiment, the scaling factor is a depth distance between the robot and the subject. As the present invention uses a monocular image (the visual feed acquired by the monocular camera), it becomes a matter of utmost importance to estimate the scale factor which may be used to scale up the measurements which in turn may be used to compute a transformation between the robot and the subject. The scale factor is used for accurate transfer of the final goal scene to frame of reference of the robot. Assuming that the robot and the subject both always stand on the same levelled floor and the point where feet of the subject touches the floor is visible in view of the robot, the depth distance may be accurately estimated between the subject and the robot. Assuming a zero pitch angle of the monocular camera with respect to the ground plane and given a height of the monocular camera above the ground $H_c$, monocular camera intrinsic calibration parameters ($K=(f_x, f_y, c_x, c_y)$) of the robot may be determined, where $f_x$, $f_y$, and $c_x$, $c_y$ are focal lengths and center parameters of the monocular camera respectively. The distance between the robot and the subject may be calculated, given the bottom of the bounding box of subject detection in the selected visual scene (if contact point between the foot and the floor is visible) as $b=(b_x, b_y)$. The depth distance d may be calculated from the below equation:

$$d = \frac{f_y H_c}{\nabla y_b}$$

where $\nabla y_b = b_y - c_y$

At step 208 of the method 200, the one or more hardware processors 104 of the system 100 are configured to generate a trajectory for the robot to reach the estimated intermediate goal pose from the present robot pose. The trajectory may be generated based on present odometry of the robot, using the pre-built 2-D occupancy map and a robot operating system (ROS) movebase planner. The trajectory is a collision free path where the robot may be freely navigated from one place to another. The robot is initialized with the information about its starting position with respect to the pre-built 2-D occupancy map and then updates its subsequent poses as it moves based on its odometry. The pre-built 2-D occupancy map along with the robot's current and the intermediate goal pose are used to plan unobstructed trajectories. Once the trajectory is generated, the robot is navigated to the estimated intermediate goal pose from the present robot pose using the pre-built 2-D occupancy map and the ROS movebase planner.

The ROS movebase planner used in the present disclosure is a standard framework for robot navigation provided by the robot operating system (ROS). It takes in robot agnostic inputs such as current position of the robot and sensor information, and then does tasks like mapping the environment of the robot, refining the current position and odometry and plans the path till the intermediate goal pose from the current goal pose by creating a plan map. The ROS movebase planner includes two parts, the first point is the global planner which creates a high level trajectory of the robot. The global planner does not consider the constraints of the robot geometry. The global planner may be path planners such as Dijkstra, A*, RRT* and so on. The second part is the local planner that takes the high level plan, breaks it down into parts and moves the robot according to it. The local planners may be path planners such as like TEB, DWA, and so on.

At step 210 of the method 200, the one or more hardware processors 104 of the system 100 are configured to acquire an intermediate goal image, from present perspective of the robot after reaching the estimated intermediate goal pose. The intermediate goal image is the image which includes the target region of interest (the black chair with the TV remote controller) associated with the task to the performed, along with other regions present in the surrounding environment.

In an embodiment, the intermediate goal image may be acquired through the monocular camera that is installed in the robot.

At step 212 of the method 200, the one or more hardware processors 104 of the system 100 are configured to predict a matching region associated with the task, based on one or more language features and the intermediate goal image acquired at step 210 of the method 200. The one or more language features are obtained from the audio feed of the subject received at step 202 of the method 200. The predicted matching region is the target region of interest with a final goal point (near the black chair) to which the robot has be moved to perform the task.

In an embodiment, a zero-shot single-stage network (ZSGNet) based language grounding technique may be employed to predict the matching region associated with the task. The zero-shot grounding mean localizing new "unseen" (unseen in training phase) objects. In an embodiment, the zero-shot single-stage network (ZSGNet) is a pre-trained deep neural network. As the present disclosure is focussed towards the indoor environment or the indoor like outdoor environment, it may be challenging to localize a wide variety of different indoor objects to add the localized objects in the training set. Zero-shot grounding really helps to account for those new objects. Given dense region proposals, the zero-shot single-stage network (ZSGNet) predicts the matching region and compact it by regression.

In an embodiment, the zero-shot single-stage network (ZSGNet) is trained with a custom indoor datasets having a plurality of images of the indoor environment along with object annotations and region descriptions. In the aspect of object localization, indoor and outdoor environments are dissimilar due to different types of objects and different nature of light sources. To make the zero-shot single-stage network (ZSGNet) working in the indoor environment, we train it with the custom indoor dataset. In embodiment, the custom indoor dataset is prepared from (i) MIT indoor dataset named 'Indoor Scene Recognition' as it contains more than 15000 indoor images with object annotations, and (ii) sub-sampled indoor images from Visual Genome with region descriptions. Also, a plurality of images with respect to the different indoor environments with associated object annotations are added to the custom indoor dataset to make it effective for training the zero-shot single-stage network (ZSGNet).

In an embodiment, the zero-shot single-stage network (ZSGNet) takes one or more language features and one or more feature maps obtained from the intermediate goal image, as input and predicts the matching region in the form of a bounding box along with a confidence score as output. The confidence score less than a predefined threshold (for example, 0.6) indicates either the matching region is not present in the view or the zero-shot single-stage network (ZSGNet) is not sure enough to detect the matching region in the current view.

At step 214 of the method 200, the one or more hardware processors 104 of the system 100 are configured to navigate the robot, to a final goal point to perform the task, using the ROS movebase planner. In an embodiment, the final goal point is determined based on the predicted matching region at step 212 of the method 200, using the pre-built 2-D occupancy map. The robot may perform the task after reaching the final goal point, based on its capabilities such as picking, gripping, holding and so on.

In accordance with the present disclosure, the methods and systems, have a two-step advantage, firstly in achieving the accurate shared perspective using gestures of the subject for better language grounding and secondly, to address the cases of ambiguity occurring due to the cases of multiple instances of the same object in the scene. The present disclosure may work as a sanity check for the human gesture based region of interest proposal by evaluating a relevance between the natural language instructions (spoken sentence) and the pointing region using gestures and hence it may be extended to request clarification or correction from the subject making the method for enabling the human robot interaction more robust to human errors. As obtained from the gestures and the speech of the subject, the present disclosure may give a far better performance with the conventional techniques, by transferring cognitive load from the human to the robot. The present disclosure effectively computes the relative frame transformation along with understanding the navigational gesture commands simplifying the directions and easing the task of the subject, hence the human robot interaction of the present makes the subject convenient and comfortable.

The present disclosure effectively performs the specific task even incase of unseen objects with multiple instances present in the target region of interest, based on the natural language instructions provided by the subject using the language grounding technique. Even in case of occluded objects present in the target region of interest, the present disclosure may recognize the target object accurately by utilizing the shared perspective after reaching the intermediate goal pose.

As the present disclosure utilizes the monocular camera installed in the robot to acquire the scenes of the subject for gesture recognition, the extra hardware is not required and hence making the human robot interaction simple and effective. The monocular camera may be easily deployable in most of off the shelf robots available in the market and hence the present disclosure provides a scope to utilize any incompatible robot to perform the specific task makes it compatible. If the systems of the present disclosure is externally connected to the robot, then the utilization of hardware resources of the robot such as processors and memory required for executing the disclosed method is significantly decreased without compromising on the overall processing time.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for enabling a human robot interaction (HRI) by sharing cognition between a subject and a robot, the method comprising the steps of:

acquiring, via one or more hardware processors, a visual feed of the subject and an audio feed of the subject, wherein the visual feed and the audio feed are acquired during a directional assistance provided by the subject to the robot, to perform a task, the visual feed comprises one or more visual scenes of the subject while providing the directional assistance, and the audio feed comprises one or more natural language instructions of the subject while providing the directional assistance;

estimating, via the one or more hardware processors, a pointing direction of the subject in a field view of the robot, based on a body skeleton based gesture of the subject and a head pose based gaze direction of the subject, using the one or more visual scenes present in the visual feed;

estimating, via the one or more hardware processors, an intermediate goal pose for the robot, based on the estimated pointing direction, at a predefined distance from a position of the subject, using a pre-built 2-dimensional (2-D) occupancy map and a scaling factor, wherein the intermediate goal pose comprises a set of coordinates defining a position and an orientation, and wherein the scaling factor is a depth distance between the robot and the subject;

generating, via the one or more hardware processors, a trajectory for the robot to reach the estimated intermediate goal pose from a present robot pose, based on a present odometry of the robot, using the pre-built 2-D occupancy map and a robot operating system (ROS) movebase planner, to navigate the robot to reach the estimated intermediate goal pose based on the generated trajectory, wherein the ROS movebase planner is a standard framework for robot navigation;

acquiring, via the one or more hardware processors, an intermediate goal image, from a present perspective of the robot after reaching the estimated intermediate goal pose;

predicting, via the one or more hardware processors, a matching region associated with the task, based on one or more language features and the intermediate goal image, using a zero-shot single-stage network (ZSG-Net) based language grounding technique, wherein the one or more language features are obtained from the audio feed of the subject; and navigating the robot, via the one or more hardware processors, to a final goal point to perform the task, using the ROS movebase planner, wherein the final goal point is determined based on the predicted matching region using the pre-built 2-D occupancy map.

2. Wherein the body skeleton based gesture of the subject is estimated by:

predicting a 3-dimensional (3-D) pose of the subject, from the one or more visual scenes present in the visual feed, using a 3-D pose prediction technique; and estimating the body skeleton based gesture of the subject as a first azimuthal angle calculated between a spine and a limb of the subject, based on the predicted 3-D pose.

3. The method of claim 2, wherein the head pose based gaze direction of the subject is estimated as a second azimuthal angle, from the one or more visual scenes present in the visual feed, using a gaze direction prediction technique.

4. The method of claim 1, wherein the visual feed of the subject and the intermediate image are acquired through a monocular camera installed in the robot and the audio feed of the subject is acquired through one or more microphones installed in the robot.

5. The method of claim 1, wherein the zero-shot single-stage network (ZSGNet) is trained with an indoor dataset having a plurality of images of an environment along with object annotations and region descriptions.

6. A system for enabling a human robot interaction (HRI) by sharing cognition between a subject and a robot, the system comprising:
a memory storing instructions;
one or more Input/Output (I/O) interfaces; and
one or more hardware processors coupled to the memory via the one or more I/O interfaces, wherein the one or more hardware processors are configured by the instructions to:
acquire a visual feed of the subject and an audio feed of the subject, wherein the visual feed and the audio feed are acquired during a directional assistance provided by the subject to the robot, to perform a task, the visual feed comprises one or more visual scenes of the subject while providing the directional assistance, and the audio feed comprises one or more natural language instructions of the subject while providing the directional assistance;
estimate a pointing direction of the subject in a field view of the robot, based on a body skeleton based gesture of the subject and a head pose based gaze direction of the subject, using the one or more visual scenes present in the visual feed;
estimate an intermediate goal pose for the robot, based on the estimated pointing direction, at a predefined distance from a position of the subject, using a pre-built 2-dimensional (2-D) occupancy map and a scaling factor, wherein the intermediate goal pose comprises a set of coordinates defining a position and an orientation, and wherein the scaling factor is a depth distance between the robot and the subject;
generate a trajectory for the robot to reach the estimated intermediate goal pose from a present robot pose, based on a present odometry of the robot, using the pre-built 2-D occupancy map and a (robot operating system) ROS movebase planner, to navigate the robot to reach the estimated intermediate goal pose based on the generated trajectory, wherein the ROS movebase planner is a standard framework for robot navigation;
acquire an intermediate goal image, from a present perspective of the robot after reaching the estimated intermediate goal pose;
predict a matching region associated with the task, based on one or more language features and the intermediate goal image, using a zero-shot single-stage network (ZSGNet) based language grounding technique, wherein the one or more language features are obtained from the audio feed of the subject; and
navigate the robot to a final goal point to perform the task, using the ROS movebase planner, wherein the final goal point is determined based on the predicted matching region using the pre-built 2-D occupancy map.

7. The system of claim 6, wherein the one or more hardware processors are further configured to estimate the body skeleton based gesture of the subject, by:

predicting a 3-dimensional (3-D) pose of the subject, from the one or more visual scenes present in the visual feed, using a 3-D pose predicting technique; and
estimating the body skeleton based gesture of the subject as a first azimuthal angle calculated between a spine and a limb of the subject, based on the predicted 3-D pose.

8. The system of claim 7, wherein the one or more hardware processors are further configured to estimate the head pose based gaze direction of the subject, as a second azimuthal angle, from the one or more visual scenes present in the visual feed, using a gaze direction prediction technique.

9. The system of claim 6, wherein the visual feed of the subject and the intermediate image are acquired through a monocular camera installed in the robot and the audio feed of the subject is acquired through one or more microphones installed in the robot.

10. The system of claim 6, wherein the zero-shot single-stage network (ZSGNet) is trained with an indoor dataset having a plurality of images of an environment along with object annotations and region descriptions.

11. A computer program product comprising a non-transitory computer readable medium having a computer readable program embodied therein, wherein the computer readable program, when executed on a computing device, causes the computing device to:
acquire a visual feed of the subject and an audio feed of the subject, wherein the visual feed and the audio feed are acquired during a directional assistance provided by the subject to the robot, to perform a task, the visual feed comprises one or more visual scenes of the subject while providing the directional assistance, and the audio feed comprises one or more natural language instructions of the subject while providing the directional assistance;
estimate a pointing direction of the subject in a field view of the robot, based on a body skeleton based gesture of the subject and a head pose based gaze direction of the subject, using the one or more visual scenes present in the visual feed;
estimate an intermediate goal pose for the robot, based on the estimated pointing direction, at a predefined distance from a position of the subject, using a pre-built 2-dimensional (2-D) occupancy map and a scaling factor, wherein the intermediate goal pose comprises a set of coordinates defining a position and an orientation, and wherein the scaling factor is a depth distance between the robot and the subject;
generate a trajectory for the robot to reach the estimated intermediate goal pose from a present robot pose, based on a present odometry of the robot, using the pre-built 2-D occupancy map and a (robot operating system) ROS movebase planner, to navigate the robot to reach the estimated intermediate goal pose based on the generated trajectory, wherein the ROS movebase planner is a standard framework for robot navigation;
acquire an intermediate goal image, from a present perspective of the robot after reaching the estimated intermediate goal pose;
predict a matching region associated with the task, based on one or more language features and the intermediate goal image, using a zero-shot single-stage network (ZSGNet) based language grounding technique, wherein the one or more language features are obtained from the audio feed of the subject; and navigate the robot to a final goal point to perform the task, using the ROS movebase planner, wherein the final goal point is determined based on the predicted matching region using the pre-built 2-D occupancy map.

* * * * *